(No Model.)

J. R. BACK.
REST FOR METAL TURNING LATHES.

No. 455,466. Patented July 7, 1891.

Witnesses
Chas. F. Schmelz.
H. M. Fowler.

Inventor
John R. Back,
By his Attorney
Rufus B. Fowler.

UNITED STATES PATENT OFFICE.

JOHN R. BACK, OF WORCESTER, MASSACHUSETTS, ASSIGNOR OF ONE-HALF TO FREDERICK E. REED, OF SAME PLACE.

REST FOR METAL-TURNING LATHES.

SPECIFICATION forming part of Letters Patent No. 455,466, dated July 7, 1891.

Application filed February 28, 1889. Serial No. 301,574. (No model.)

*To all whom it may concern:*

Be it known that I, JOHN R. BACK, a citizen of the United States, residing at Worcester, in the county of Worcester and State of Massachusetts, have invented certain new and useful Improvements in Rests for Metal-Turning Lathes, of which the following is a specification, accompanied by drawings, which form a part of the same and which represent such parts of a metal-turning lathe as embody my invention.

Figure 1:
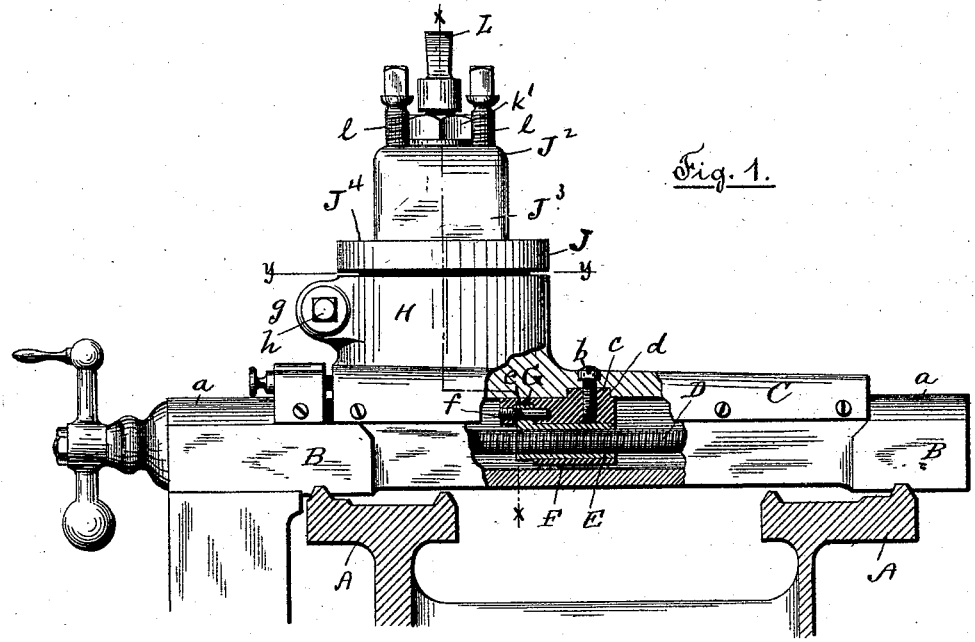
Figures 2, 3:
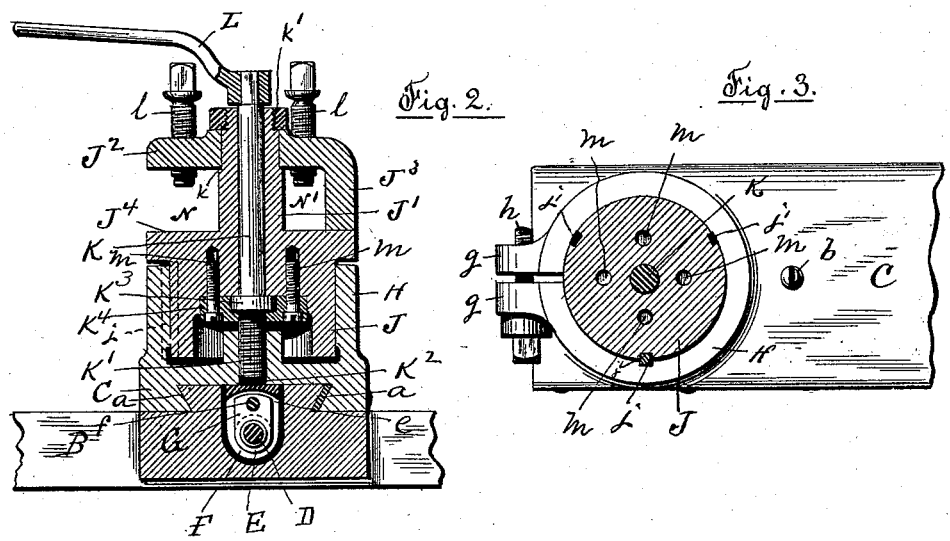

Figure 1 represents a side elevation of the sliding tool-rest, the ways of the lathe and also a portion of the tool-rest being shown in sectional view. Fig. 2 shows a sectional view on line X X, Fig. 1; and Fig. 3 represents a portion of the tool-rest in sectional view upon line Y Y, Fig. 1.

Similar letters refer to similar parts in the several views.

My invention relates to that portion of a metal-turning lathe employed in supporting the cutting-tool; and it has for its objects to provide means for the rigid support of the cutting-tool during the operation of cutting, to provide means whereby the cutting-tool can be raised or lowered with reference to the work, and to provide means for the replacement of the nut by which the transverse feeding motion of the cutting-tool is effected, and in the construction and arrangement of the several parts, as hereinafter described, and set forth in the claims.

Referring to the drawings, A A denote the ways of an ordinary metal-turning lathe; B, a carriage having a sliding movement along the ways A A and provided with transverse ways $a\ a$, upon which the slide C is placed, capable of sliding transversely to the ways A A, by means of an actuating-screw D, held in the carriage B and passing through the nut E, so attached to the slide C that the rotation of the actuating-screw D will cause the slide to be moved upon the ways $a\ a$. As the nut E is liable to become worn in use, I provide for its replacement by attaching a sleeve F to the slide C by means of the screw-threaded bolt $b$, a projecting lug $c$ on the sleeve entering and fitting a corresponding recess $d$ in the slide C in order to prevent the sleeve F from being moved out of its alignment with the actuating-screw D, whose axis is coincident with that of the sleeve F. The nut E is turned upon the outside to fit the sleeve F, and is provided with a flange G upon one side, which enters a recess $e$ in the sleeve F, to which the flange G is attached by the screw $f$. When the nut becomes worn by use, the actuating-screw is withdrawn from the nut and the nut removed from the sleeve F by withdrawing the screw $f$ and giving the nut a partial rotation to remove the flange G from the recess $e$, allowing the nut to be readily removed from the sleeve and a new nut inserted in the sleeve, fitting the interior of the sleeve and having its outer surface concentric with its screw-threaded bore, thereby bringing the axis of the nut concentric with the axis of the sleeve, which is permanently attached to the slide C with its axis coincident with the axis of the actuating-screw D. The nut is thus readily replaced whenever desired without requiring adjustment to the actuating-screw, and new nuts are readily and cheaply fitted for use by simply making them cylindrical with their outer surface concentric with their screw-threaded bore and fitting the bore of the sleeve F.

Upon the upper surface of the slide and integral therewith is a hollow cylindrical boss H, open at one side and provided with the lugs $g\ g$, through one of which the screw $h$ passes, screwing into the other lug. Within the hollow boss H is a cylindrical block J, capable of sliding vertically in the boss, but held from turning therein by means of the spline $j$, held in the inner wall of the boss H and entering one of the corresponding grooves $j'\ j'\ j'$ in the block J. Projecting above the block J is a post J', concentric with the block J and carrying a strap $J^2$, resting against the shoulder $k$ and held in position by the nut $k'$. The strap $J^2$ has a heel $J^3$, bent downward and resting upon the upper surface of the block J, and upon opposite sides of the post J' are placed the tightening-screws $l\ l$, arranged in pairs, for the purpose of binding the cutting-tool upon the upper surface J⁴ of the block J. Held concentrically with the block J and post J′ and capable of turning freely therein is a bolt K, provided with a screw-threaded section K′ at its lower end, entering a screw-threaded hole K² in the slide. The bolt K is held from moving longitudinally within the block J and post J′ by means of a flange K³, held in a recess in the washer K⁴, attached to the under side of the block J by means of the screws m m, Figs. 2 and 3. The upper end of the bolt K is fitted to receive a wrench L, by which the bolt is rotated in the screw-threaded hole K², thereby raising and lowering the block J by means of the flange K³. The cutting-tool is placed upon either side of the post J′, and beneath the strap J², with the points of the binding-screws l resting upon its upper edge and pressing it upon the surface J⁴; or, if it is desired, two tools can be used upon opposite sides of the post J′ and in the spaces N N′, Fig. 2, and the tools are raised or lowered by the rotation of the bolt K, the block J sliding upon the spline j. In case it is not required to raise or lower the tools while in the operation of cutting, the block J is clamped in the boss H by the clamping-screw h, held in the lugs g g, thereby securely holding the block J from being turned by the strain upon the cutting-tools, and also relieving the spline j from strain. By loosening the nut k′ the strap J² is turned upon the post J′, allowing the cutting-tools to be placed at an angle with the work.

As the continued use of the cutting-tools upon the surface J⁴ in the same position would in time wear the surface out of truth, I employ the spline j and grooves j′ j′ j′ in the block J alternately to hold the block J from rotation. I am thereby able to withdraw the block J from the boss H and turn it a partial rotation about its axis and replace it, thus bringing a fresh surface beneath the cutting-tools whenever it is desired to perform an accurate piece of work.

The devices above described for the purpose of raising or lowering the cutting-tools operate independently of any mechanism for imparting a longitudinal or transverse motion to the cutting-tools, and so much of my present invention as is concerned with the raising and lowering mechanism is not, therefore, confined to any specific construction or arrangement of the slide-rest or to the use of a slide-rest for the purpose of supporting the cutting-tool.

What I herein claim as of my invention, and desire to secure by Letters Patent, is—

1. The combination, with the slide carrying the cutting-tool, of a sleeve provided with a lug entering a recess in said slide, an attaching-screw by which the screw is attached to said slide, a nut held in said sleeve and provided with a flange entering a recess in said sleeve, and an attaching-screw by which said flange is attached to said sleeve, thereby holding said nut from rotary or longitudinal movement, and an actuating-screw passing through said nut, substantially as described.

2. The combination, with the slide carrying the cutting-tool, of a sleeve attached to said slide, a nut held in said sleeve and provided with a flange entering a recess in said sleeve, an attaching-screw by which said flange is attached to said sleeve and by which said nut is held from rotary or longitudinal movement, and an actuating-screw passing through said nut, substantially as described.

3. The combination, with slide C, carrying the cutting-tool, of a sleeve F, having a lug c, entering a recess d in said slide, attaching-screw by which the sleeve is attached to the slide, a nut held in said sleeve and prevented from turning, and an actuating-screw passing through said nut, substantially as described.

4. The combination of the tool-supporting block and a concentric post projecting from the upper surface of said tool-supporting block and provided with a shoulder k, a rotating tool-clamping strap journaled upon said post, a tightening-nut k′, carried on said post, and clamping-screws l, held in said strap, substantially as described.

5. The combination, with the slide C, of the cylindrical boss H, provided with a recess to receive a tool-supporting block, a spline held in the inner wall of said recess, a tool-supporting block provided with a series of grooves arranged to receive said spline, a concentric tool-post projecting from the upper side of said tool-supporting block and integral therewith, said post being provided with a shoulder k, a tool-clamping strap rotating upon said post, and a tightening-nut held on said post, substantially as described.

6. The combination of a tool-supporting block, a concentric post extending upwardly from the tool-supporting surface of said block, a tool-clamping strap held on said post, an elevating-screw extending through said tool-supporting block and said concentric post, with its upper end projecting above said post and above said tool-clamping strap to receive a wrench, and a fixed nut engaged by said elevating-bolt, an annular flange on said elevating-bolt bearing against the under surface of said tool-supporting block, whereby said block is raised by the rotation of said bolt, substantially as described.

7. The combination of a tool-post capable of a vertical sliding motion in ways, a concentric actuating screw-threaded bolt held in said tool-post, a clamping-strap capable of rotating around said tool-post and held on said tool-post, and binding-screws carried in said clamping-strap, substantially as described.

8. The combination, with a tool-supporting block, of a concentric post extending upwardly from the tool-supporting surface of said block and provided with a shoulder K, a tool-clamping strap turning about said post and having one end bent downward to rest upon the tool-supporting surface of said block, a tightening-nut held upon said concentric post, whereby said clamping-strap is held in position, and tightening-screws held in said clamping-strap, substantially as described.

Executed at Worcester, county of Worcester, and State of Massachusetts, this 22d day of February, A. D. 1889.

JOHN R. BACK.

Witnesses:
RUFUS B. FOWLER,
T. A. WICKHAM.